US010257838B2

(12) United States Patent
Jia et al.

(10) Patent No.: US 10,257,838 B2
(45) Date of Patent: Apr. 9, 2019

(54) STANDARDIZED COMMANDS FOR COVERAGE MODES IN A WIRELESS COMMUNICATIONS SYSTEM

(71) Applicant: AT&T Intellectual Property I, L.P., Atlanta, GA (US)

(72) Inventors: Yupeng Jia, Austin, TX (US); Inderpreet Ahluwalia, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/600,381

(22) Filed: May 19, 2017

(65) Prior Publication Data

US 2018/0338303 A1 Nov. 22, 2018

(51) Int. Cl.
*H04W 72/00* (2009.01)
*H04W 72/04* (2009.01)
*H04W 8/24* (2009.01)
*H04L 29/08* (2006.01)
*H04W 84/04* (2009.01)

(52) U.S. Cl.
CPC ........... *H04W 72/048* (2013.01); *H04L 67/12* (2013.01); *H04W 8/24* (2013.01); *H04W 84/042* (2013.01)

(58) Field of Classification Search
CPC ... H04W 72/048; H04W 8/24; H04W 84/042; H04L 67/12
See application file for complete search history.

(56) References Cited

U.S. PATENT DOCUMENTS 6,122,639 A * 9/2000 Babu ..................... H04L 12/12
7,835,330 B2 11/2010 Parker
(Continued)

FOREIGN PATENT DOCUMENTS

CA 2706140 A1 5/2009
FR 2841425 A1 12/2003
(Continued)

OTHER PUBLICATIONS

Kirubakaran, et al. "Surveillance and Steering of Agricultural Field using Zigbee," International Journal on Recent and Innovation Trends in Computing and Communication, Mar. 2014, pp. 668-672, vol. 2, Issue 3, 5 pages.
(Continued)

*Primary Examiner* — Khai M Nguyen
(74) *Attorney, Agent, or Firm* — Amin, Turocy & Watson, LLP

(57) ABSTRACT

Standardized commands for coverage modes in a wireless communications system are provided herein. A method can comprise, in response to a first command received from a network device of a wireless network, facilitating, by a device comprising a processor, transmitting a first value to the network device that indicates a device type of the device. The method can also comprise, in response to a second command received from the network device, facilitating, by the device, transmitting a second value to the network device that indicates a coverage mode of the device. Further, the method can comprise, in response to a third command received from the network device, facilitating, by the device, transmitting respective repetition numbers for physical channels of a group of physical channels.

20 Claims, 10 Drawing Sheets

(56) References Cited

U.S. PATENT DOCUMENTS

| | | |
|---|---|---|
| 8,391,921 B2 | 3/2013 | Moran et al. |
| 8,767,630 B1 | 7/2014 | Collins et al. |
| 8,837,370 B2 | 9/2014 | Mohammed et al. |
| 8,937,910 B2 | 1/2015 | Mohammed et al. |
| 8,942,181 B2 | 1/2015 | Collins et al. |
| 9,119,131 B2 | 8/2015 | Mohammed et al. |
| 9,510,354 B2 | 11/2016 | Mussot |
| 9,642,028 B2 | 5/2017 | Koskinen et al. |
| 2014/0126549 A1* | 5/2014 | Beale ............... H04W 16/08 370/336 |
| 2014/0349577 A1* | 11/2014 | Matsuda ............. H04W 4/80 455/41.2 |
| 2015/0223146 A1 | 8/2015 | Pinheiro et al. |
| 2015/0271708 A1 | 9/2015 | Zaus et al. |
| 2016/0218962 A1* | 7/2016 | Huang-Fu ........... H04L 29/08 |
| 2016/0219451 A1* | 7/2016 | Gupta .............. H04W 72/005 |
| 2016/0226922 A1 | 8/2016 | Russell et al. |
| 2016/0323739 A1 | 11/2016 | Addepalli et al. |
| 2016/0353440 A1* | 12/2016 | Lee ................ H04W 4/70 |
| 2017/0064670 A1* | 3/2017 | Shen ............. H04W 68/005 |
| 2017/0094603 A1 | 3/2017 | Huang-Fu et al. |
| 2017/0134124 A1* | 5/2017 | Lee ............... H04L 1/1812 |
| 2017/0238302 A1* | 8/2017 | Futaki ........... H04W 72/048 370/329 |
| 2018/0049087 A1* | 2/2018 | Lee ................ H04W 36/08 |
| 2018/0070282 A1* | 3/2018 | Su ................. H04W 36/32 |

FOREIGN PATENT DOCUMENTS

| | | |
|---|---|---|
| WO | 2016108137 A1 | 7/2016 |
| WO | 2016122785 A1 | 8/2016 |
| WO | 2016186685 A1 | 11/2016 |
| WO | 2017025389 A1 | 2/2017 |

OTHER PUBLICATIONS

Sundar, et al., "Implementing Intelligent Traffic Control System for Congestion Control, Ambulance Clearance, and Stolen Vehicle Detection," IEEE Sensors Journal, Feb. 2015, pp. 1109-1113, vol. 15, No. 2, IEEE, 5 pages.

Shiny, et al., "Monitoring Factory Machine Status from Remote Location using GSM Technologies," International Journal of Computer Science and Mobile Computing, Feb. 2014, pp. 343-352, vol. 3, Issue 2, 10 pages.

Wareed, "Principles of Designing Adaptable Smart Computerized System," Nov. 2014, 73 pages.

Tso, et al., "DragonNet: A Robust Mobile Internet Service System for Long Distance Trains," IEEE Conference on Computer Communications, 2011, 9 pages. http://eprints.gla.ac.uk/56409/1/56409.pdf.

* cited by examiner

STANDARDIZED COMMANDS FOR COVERAGE MODES IN A WIRELESS COMMUNICATIONS SYSTEM

TECHNICAL FIELD

This disclosure relates generally to the field of wireless communication and, more specifically, to standardized commands for coverage modes in a wireless communications system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
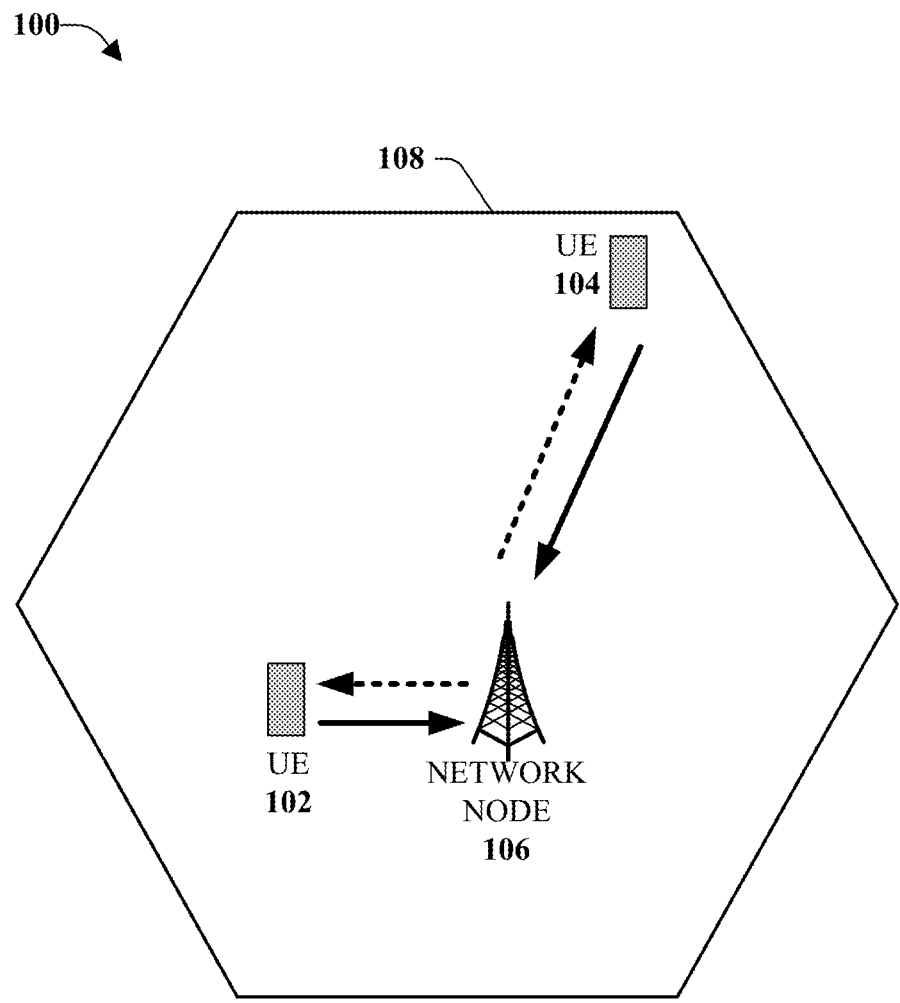
FIG. 1 illustrated is an example, non-limiting, wireless communication system in accordance with one or more embodiments described herein.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure can be embodied in many different forms and should not be construed as limited to the example embodiments set forth herein.

Described herein are systems, methods, articles of manufacture, and other embodiments or implementations that can facilitate mechanisms to provide a notification when a user equipment (UE) enables coverage enhancement (CE) based on a network instruction while the device is in poor Radio Frequency (RF) condition. The UE can be various types of devices including, but not limited to, a mobile device and an Internet of Things (IoT) device. As provided herein, commands are provided that allow the UE to indicate the coverage enhancement mode and repetition numbers on each physical channel. The repetition number can be a specified value for repeating a basic random access preamble, according to some implementations. If a UE has a Graphical User Interface (GUI), the UE can display a tag indicating a device is in CE mode.

According to some implementations, the commands utilized herein are instructions used to control a modem. Such commands are referred to as AT commands, which is an abbreviation for Attention (or ATtention). For these types of commands, every command line starts with "AT" or "at," which informs the modem it is the beginning of a command line. There are two types of AT commands, namely, basic commands and extended commands. Extended commands start with "+" while basic commands do not start with "+." The various commands discussed herein are extended commands.

3GPP defines Coverage Enhancement for Bandwidth Reduced Low Cost (BL) UE in Release 13. There are two major categories of BL UEs. A first category of BL UE is Category M1 (CAT-M1), which is a technology that utilizes a small portion of bandwidth on the communication network and can conserve energy and, thus, extend battery life. For CAT-M1, 3GPP has defined two coverage enhancement modes, namely Mode A and Mode B. Coverage Enhancement Mode A comprises a 5-10 dB coverage extension. Coverage Enhancement Mode B comprises a 15 dB coverage extension.

A second category of BL UE is Narrow Band-Internet of Things (NB-IoT). NB-IoT is a low power wide area network radio technology standard. This type of device utilizes a Low Power Wide Area Network (LPWAN) radio technology standard (e.g., connected using cellular telecommunications bands). The focus of NB-IoT includes indoor coverage, extended battery life, and enablement of a large quantity of connected devices. For NB-IoT, there are no separate coverage extension modes defined. Instead, the same UE behavior is used for all coverage levels. However, many 3GPP evaluations can be performed for three different coverage levels. A first coverage level is basic coverage, which can comprise a 0 dB coverage extension. A second coverage level is robust coverage, which can comprise a 10 dB coverage extension. A third coverage level is extreme coverage, which can comprise a 20 dB coverage extension.

In Release 14, 3GPP defines that a high end modem (non-Bandwidth reduced Lowcost, non-BL) UE might need to support coverage enhancements.

It can be difficult to identify whether a UE is in Enhanced Coverage (EC) mode during certain operations. For example, it can be difficult to determine if the device is in cover mode while field tests and/or laboratory tests of the CE feature are being conducted. In another example, end users might also need the indication to determine if the UE is in CE mode and in what CE mode. These indications are not available from chipset vendors and/or original equipment manufacturers. Therefore, the various aspects discussed herein can provide a mechanism to allow for the determination as to whether a UE enters CE mode. Further, the various aspects can facilitate a determination as to what CE mode the UE enters. The determinations can be enabled through a GUI and/or through commands, such as AT commands.

In one embodiment, described herein is a method that can comprise, in response to a first command received from a network device of a wireless network, facilitating, by a device comprising a processor, transmitting a first value to the network device that indicates a device type of the device. The method can also comprise, in response to a second command received from the network device, facilitating, by the device, transmitting a second value to the network device that indicates a coverage mode of the device. Further, the method can comprise, in response to a third command received from the network device, facilitating, by the device, transmitting respective repetition numbers for physical channels of a group of physical channels. The respective repetition numbers can specify respective values for an access preamble.

According to another embodiment, a system can include a processor and a memory that stores executable instructions that, when executed by the processor, facilitate performance of operations. The operations can comprise facilitating a first transmission of a first command to a device. The first command can instruct the device to provide a device type of the device to the system. The operations can also comprise facilitating a second transmission of a second command to the device. The second command can instruct the device to provide a coverage mode setting of the device to the system. Further, the operations can comprise facilitating a third transmission of a third command to the device. The third command can instruct the device to provide, to the system, respective repetition numbers on physical channels of a group of physical channels supported by the device.

According to yet another embodiment, described herein is a machine-readable storage medium comprising executable instructions that, when executed by a processor, facilitate performance of operations. The operations can comprise receiving, from a network device, a first command to provide a device type of a device comprising the processor, and sending, to the network device, a first indication value of the device type. The first indication value can be selected from a group of indication values defined for the device type. The operations can also comprise receiving, from the network device, a second command to provide a coverage mode of the device, and sending, to the network device, a second indication value of the coverage mode. The second indication value can be selected from a group of second indication values defined for the coverage mode and based on the device type. Further, the operations can comprise receiving, from the network device, a third command to provide a third indication value of respective repetition numbers for physical channels of a group of physical channels supported by the device, and sending, to the network device, the third indication value of the respective repetition numbers. The third indication value can be selected from a group of enumerated values.

Referring initially to FIG. 1 illustrated is an example, non-limiting, wireless communication system 100 in accordance with one or more embodiments described herein. The wireless communication system 100 can comprise one or more user equipment devices 102 and 104, which can have one or more antenna panels having vertical and horizontal elements. A user equipment device can be a mobile device such as a cellular phone, a smartphone, a tablet computer, a wearable device, a virtual reality (VR) device, a heads-up display (HUD) device, a smart car, a machine-type communication (MTC) device, and the like. A user equipment device can also comprise IoT devices that communicate wirelessly. In various embodiments, the wireless communication system 100 can comprise a wireless communication network serviced by one or more wireless communication network providers. In example embodiments, a user equipment device can be communicatively coupled to the wireless communication network via a network node device 106.

The non-limiting term network node (or radio network node) is used herein to refer to any type of network node serving user equipment device 102, user equipment device 104, and/or connected to other network node, network element, or another network node from which the user equipment devices 102 or 104 can receive a radio signal. Network nodes can also have multiple antennas for performing various transmission operations (e.g., Multiple Input Multiple Output (MIMO) operations). A network node can have a cabinet and other protected enclosures, an antenna mast, and actual antennas. Network nodes can serve several cells, also called sectors, depending on the configuration and type of antenna. Examples of network nodes (e.g., network node device 106) can comprise but are not limited to: NodeB devices, base station (BS) devices, access point (AP) devices, and radio access network (RAN) devices. The network node device 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like. In 5G terminology, the network node device 106 can be referred to as a gNodeB device.

The wireless communication system 100 can employ various cellular technologies and modulation schemes to facilitate wireless radio communications between devices (e.g., the user equipment devices 102 and 104 and the network node device 106). For example, the wireless communication system 100 can operate in accordance with a universal mobile telecommunications system (UMTS), long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), Orthogonal Frequency-Division Multiplexing (OFDM), Discrete Fourier Transform (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of the wireless communication system 100 are particularly described wherein the devices (e.g., the user equipment devices 102 and 104 and the network node device 106) of the wireless communication system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, the wireless communication system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional user equipment devices (e.g., phones, smartphones, tablets, personal computers, televisions, Internet enabled televisions, and so on) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

The network node can also enable narrow band networks including narrowband (NB) IoT networks, and 3GPP Category M1 networks and devices. In various embodiments, user equipment devices 102 and 104 can also be devices other than mobile devices, such as wearable devices, embedded devices in televisions, water meters, refrigerators, and other home appliances and industrial systems, sensors, and any other devices that are low throughput and low latency devices.

Figure 2:
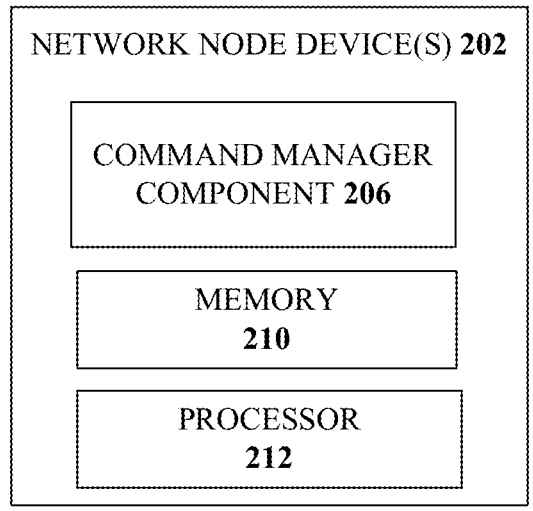
FIG. 2 illustrates an example, non-limiting, communications system for facilitating implementation of commands for coverage enhancements in accordance with one or more embodiments described herein.
Figure 2:
Figure 2:
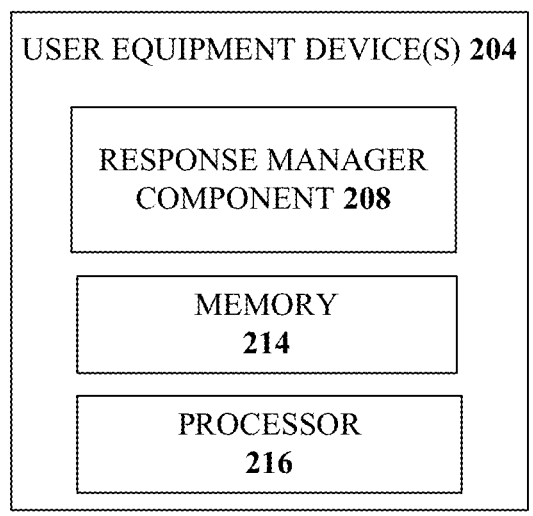

FIG. 2 illustrates an example, non-limiting, communications system 200 for facilitating implementation of commands for coverage enhancements in accordance with one or more embodiments described herein. The communications system 200 can include a network node device 202 and a user equipment device 204. The network node device 202 can be included in a group of network node devices of a wireless network. Although illustrated as a single network node device 202 and a single user equipment device 204, there can be more than one network node device and/or more than one user equipment device in a communications system.

The user equipment device 204 can be various types of devices including IoT devices. IoT is a term used to describe an inter-network of physical devices and enables the devices to exchange data. IoT devices include a wide variety of devices that can be configured to communicate with other devices, including other IoT devices and/or network node devices. Examples of IoT devices include, but are not limited to a light bulb, a washing machine, a refrigerator, a heart monitoring implant, a vehicle, a subcomponent of a vehicle, utility meters, and so on.

In one example of a light bulb as an IoT device (e.g., the user equipment device 204), a manufacturer of the light bulb might use a module from a first vendor to operate the light bulb. Since the first vendor might use a proprietary interface (e.g., a first computing platform) for the module, the manufacturer employs an application to operate the light bulb that is configured for use with the module from the first vendor. At some point, the manufacturer of the light bulb might decide to change to a second vendor, which supplies a module that uses a different proprietary interface (e.g., a second computing platform), the manufacturer would need to change the application operating the light bulb to operate with the module from the second vendor. However, with the various aspects disclosed herein, the application employed to operate the light bulb can utilize standardized commands (or AT commands) that can interface with both the proprietary interface of the first vendor, the proprietary interface of the second vendor, as well as proprietary interfaces of other vendors. Thus, in this example, even through the interface of the light bulb module changes, the manufacturer of the light bulb does not have to change the software (e.g., application) operating the light bulb.

The network node device 202 can include a command manager component 206 that can facilitate a transmission of one or more commands to the user equipment device 204. It is noted the commands can be AT commands, in accordance with some implementations. The user equipment device 204 can include a response manager component 208 that can convey respective defined values in response to the one or more commands.

The one or more commands can be utilized for coverage enhancement for the user equipment device 204. Coverage enhancement refers to the ability to enable communications when the user equipment device 204 is in a location where wireless coverage is lacking due to a location and/or a static nature of the user equipment device 204 (e.g., poor RF condition). For example, the user equipment device 204 could be located in a building or other structure and, therefore, the communication suffers from penetration losses. Further, the user equipment device 204 could be a stationary device and, therefore, could be without wireless communications coverage. For example, in the case when the user equipment device is a utility meter, the meter may be located in the basement of a house. Therefore, enhanced coverage should be enabled in order for the wireless communications to penetrate the walls and floor of the house.

The command manager component 206 can facilitate transmission of a first command instructing the user equipment device 204 to provide an indication of a device type. The response manager component 208 can provide a first defined value to indicate the device type. For example, the first defined value can be selected from a set of integer types. A first integer type of the set of integer types can indicate the user equipment device 204 is not a band reduced low cost (BL) device. A second integer type of the set of integer types can indicate the user equipment device 204 is a band reduced low cost (BL) device. Further, a third integer type of the set of integer types can indicate the user equipment device 204 is a band reduced low cost (BL)/narrow band (NB) IoT device. Further details related to the group of values will be provided below with respect to FIG. 3.

The command manager component 206 can further facilitate transmission of a second command instructing the user equipment device 204 to provide an indication of a coverage enhancement mode setting. In reply, the response manager component 208 can provide a value selected from a group of values indicating the mode setting, wherein the group of values are defined based on the type of device, as indicated in response to the first command. Further details related to the group of values will be provided below with respect to FIG. 3.

Further, the command manager component 206 can facilitate transmission of a third command instructing the user equipment device 204 to provide an indication of respective display repetition numbers for physical channels of a set of physical channels.

In addition, the network node device 202 can include a memory 210 and a processor 212. The memory 210 can be operatively connected to the processor 212. Further, the memory 210 can store executable instructions that, when executed by the processor 212 facilitate performance of operations. In addition, the processor 212 can be utilized to execute computer executable components stored in the memory 210.

For example, the memory 210 can store protocols associated with sending one or more commands to the user equipment device 204 as discussed herein. Further, the memory 210 can facilitate action to control communication between the network node device 202 and the user equipment device 204 such that the communications system 200 can employ stored protocols and/or algorithms to achieve improved communications in a wireless network as described herein.

The user equipment device 204 can also include a memory 214 operatively connected to a processor 216. The memory 214 can store executable instructions that, when executed by the processor 216 facilitate performance of operations and/or the processor 216 can be utilized to execute computer executable components stored in the memory 214.

The memory 214 can store protocols associated with replying to one or more AT commands received from the network node device 202 as discussed herein. Further, the memory 214 can facilitate action to control communication between the user equipment device 204 and the network node device 202 such that the communications system 200 can employ stored protocols and/or algorithms to achieve improved communications in a wireless network as described herein.

The respective memories 210, 214 can store respective protocols associated with standardized commands for coverage enhancements in a wireless communications system, taking action to control communication between the network node device 202 and the user equipment device 204, such that the communications system 200 can employ stored protocols and/or algorithms to achieve improved communications in a wireless network as described herein. It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The respective processors 212, 216 can facilitate respective analysis of information related to standardized commands for coverage enhancements. The processors 212, 216 can be processors dedicated to analyzing and/or generating information received, processors that control one or more components of the communications system 200, and/or processors that both analyze and generate information received and control one or more components of the communications system 200.

Further, the term network node device (e.g., network node, network device) is used herein to refer to any type of network node serving communications devices and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., Multiple Input Multiple Output (MIMO) operations). A network node can comprise a cabinet and other protected enclosures, an antenna mast, and actual antennas. Network nodes can serve several cells, also called sectors, depending on the configuration and type of antenna. Examples of network nodes (e.g., network node device 202) can include but are not limited to: NodeB devices, base station (BS) devices, access point (AP) devices, TRPs, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

Figure 3:
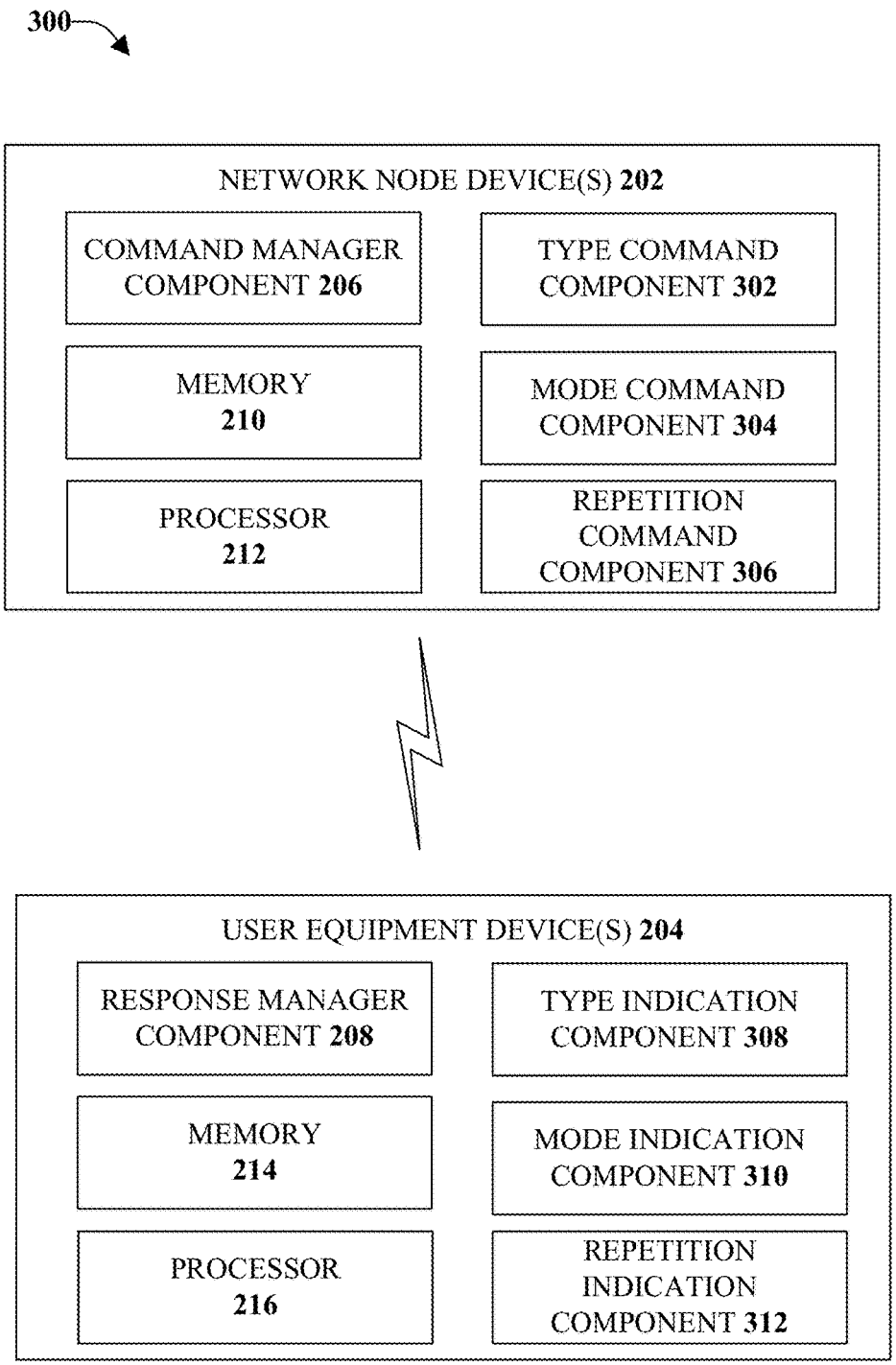
FIG. 3 illustrates an example, non-limiting, communications system for providing standard commands for coverage enhancement mode determinations in accordance with one or more embodiments described herein.

FIG. 3 illustrates an example, non-limiting, communications system 300 for providing standard commands for coverage enhancement mode determinations in accordance with one or more embodiments described herein. Repetitive description of like elements employed in other embodiments described herein is omitted for sake of brevity. The communications system 300 can comprise one or more of the components and/or functionality of communications system 200 and vice versa.

As illustrated, the network node device 202 can comprises a type command component 302, a mode command component 304, and a repetition command component 306. Further, the user equipment device 204 can comprise a type indication component 308, a mode indication component 310, and a repetition indication component.

The type command component 302 can facilitate a transmission instructing the user equipment device to respond to the instruction and provide a device type. For example, the command type component can send command +PADT? and/or command +PDAT=?, as indicated in Table 1 below. The read command (+PADT?) instructs the user equipment device 104 to show the current device type setting of the device. The test command (+PDAT=?) instructs the user equipment device 104 to display values supported as a compound value.

TABLE 1

| Command | Possible Response(s) |
| --- | --- |
| +PADT? | +PADT: <device type> |
| +PADT=? | +PADT: (list of supported <device type>s) |

The type indication component 308 can respond to the command with the device type expressed as an integer type. Three <device type>: integer type values can be defined as "0," "1," and "2." The first integer type, "0," can indicate the device is not a band reduced low cost (BL) UE. The second integer type, "1," can indicate the device is a band reduced low cost (BL) UE-CAT-M1. The third integer type "2," can indicate the device is a band reduced low cost (BL) UE-NB-IoT (CAT-NB1) device.

Thus, the following defined values can be utilize by the type indication component 308:
Defined Values
<device type>: integer type
0—device is not a band reduced low cost (BL) UE
1—device is a band reduced low cost (BL) UE-CAT-M1
2—device is a band reduced low cost (BL) UE-NB-IOT (CAT-NB1)

According to some implementations, the user equipment device 204 can be programmed with the appropriate integer value associated with its device type. Thus, when a command is received instructing the user equipment device to respond with the device type, the user equipment device can automatically respond with the appropriate integer value, which might not change for the device.

The mode command component 304 can facilitate a transmission instructing the user equipment device to respond to the instruction and provide a coverage enhancement mode of the device. For example, the mode command component 304 can send command +PACEM? and/or command +PACEM=?, as indicated in Table 2 below. The read command (+PACEM?) instructs the user equipment device 204 to show the current coverage enhancement (CE) mode setting based on the device type. The test command (+PACEM=?) instructs the user equipment device 104 to display values supported, wherein the values should be displayed as a compound value.

TABLE 2

| Command | Possible Response(s) |
| --- | --- |
| +PACEM? | +PACEM: <CE Mode> |
| +PACEM=? | +PACEM: (list of supported <CE Mode>s) |

The mode indication component 310 can respond to the command with the CE mode expressed as an integer type. For example, if the user equipment device 104 is a CAT M1 device, the mode indication component 310 can respond with "00" if the device is in CE Mode A without repetitions; with "01" if the device is in CE Mode A with repetitions, or with "02" if the device is in CE Mode B.

Alternatively, if the user equipment device 204 is a NB-IoT device, the mode indication component 310 can respond with "10" if the device is in basic coverage; with "11" if the device is in robust coverage; or with "12" if the device is in extreme coverage.

Alternatively, if the user equipment device is an LTE device that supports CE feature, the mode indication component 310 can respond with "20" if the device is in CE Mode A without repetitions; with "21" if the device is in CE Mode A with repetitions; or with "22" if the device is in CE Mode B.

Thus, the following defined values can be utilize by the mode indication component 310:
Defined Values
<CE Mode>: integer type
Valid responses for CAT M1 device are:
00—if the device is in CE Mode A without repetitions
01—if the device is in CE Mode A with repetitions, or
02—if the device is in CE Mode B
Valid responses for NB-IoT device are
10—if the device is in basic coverage
11—if the device is in robust coverage, or
12—if the device is in extreme coverage
Valid responses for LTE device support CE feature (Rel-14) are
20—if the device is in CE Mode A without repetitions
21—if the device is in CE Mode A with repetitions, or
22—if the device is in CE Mode B The repetition command component 306 can facilitate a transmission instructing the user equipment device to respond to the instruction and provide repetition numbers on each physical channel. For example, the repetition command component 306 can send command +PARN? and/or command +PARN=? as indicated in Table 3 below. The read command (+PARN?) instructs the user equipment device to show repetition numbers on each physical channel. In Table 3, "M" refers to CAT M1 device type and LTE device with CE feature devices, "N" refers to NB-IoT device type.

TABLE 3

| Command | Possible Response(s) |
| --- | --- |
| +PARN? | +PARN: < RepetitionNumberPRACH>, <RepetitionNumber(M/N)PDCCH> , <RepetitionNumber(N)PDSCH>, <RepetitionNumberPUCCH>, <RepetitionNumber(N)PUSCH> |
| +PARN=? | +PARN: (list of supported < RepetitionNumberPRACH>, <RepetitionNumber(M/N)PDCCH> , <RepetitionNumber(N)PDSCH>, <RepetitionNumberPUCCH>, <RepetitionNumber(N)PUSCH>) |

The repetition indication component 312 can respond to the command with the repetition number expressed as an integer type as will now be described.

A CAT M1 device and LTE device with CE feature can support the following physical channels: MTCH Physical Downlink Control Channel (MPDCCH), Physical Downlink Shared Channel (PDSCH), Physical Random Access Channel (PRACH), Physical Uplink Shared Channel (PUSCH), and Physical Uplink Control Channel (PUCCH). NB-IoT can support the following physical channels: Narrowband Physical Downlink Control Channel (NPDCCH), Narrowband Physical Downlink Shared Channel (NPDSCH), Narrowband Physical Random Access Channel (NPRACH), Narrowband Physical Uplink Shared Channel (NPUSCH).

It is noted that except for RACH transmission, all data can be sent over the NPUSCH for NB-IoT. This also includes the uplink control information (UCI), which can be transmitted using a different format. Consequently, there is no equivalent to the PUCCH in CAT M1 and LTE.

The test command displays values supported as a compound value.

Defined Values
<RepetitionNumber(N)PRACH>: integer type
0—1
1—2
2—4
3—8
4—16
5—32
6—64
7—128
8—256

As defined in 3GPP TS 36.331, Chapter 6.3.2 Radio resource control information elements:

```
CAT M1 PRACH
PRACH-ParametersCE-r13 ::=       SEQUENCE {
prach-ConfigIndex-r13            INTEGER (0..63),
prach-FreqOffset-r13             INTEGER (0..94),
prach-StartingSubframe-r13       ENUMERATED {sf2, sf4,
                                 sf8, sf16, sf32, sf64,
                                 sf128, sf256} OPTIONAL, --
Need OP
maxNumPreambleAttemptCE-r13
                                 ENUMERATED {n3, n4, n5, n6, n7, n8, n10}
OPTIONAL,
-- Need OP
numRepetitionPerPreambleAttempt-r13   ENUMERATED
                                 {n1,n2,n4,n8,n16,n32,n64,n128},
mpdcch-NarrowbandsToMonitor-r13  SEQUENCE (SIZE(1..2))
OF
                                 INTEGER
(1..maxAvailNarrowBands-r13),
mpdcch-NumRepetition-RA-r13      ENUMERATED {r1,r2,
r4, r8, r16,
                                 r32,r64,r128,r256},
prach-HoppingConfig-r13          ENUMERATED {on,off}
}
```

The following is stated in 3GPP TS 36.331 chapter 6.7 NB-IoT RRC messages,
NB-IoT NPRACH
numRepetitionsPerPreambleAttempt-r13 ENUMERATED {n1, n2, n4, n8, n16, n32, n64, n128},
Further values include:
<RepetitionNumber(M/N)PDCCH>: integer type
0—1
1—2
2—4
3—8
4—16
5—32
6—64
7—128
8—256
9—512
10—1024
11—2048

As stated in 3 GPP TS 36.331 Chapter 6.3.2 Radio resource control information elements,

```
CAT M1 MPDCCH
PCCH-Config-v1310 ::=            SEQUENCE {
   paging-narrowBands-r13        INTEGER
                                 (1..maxAvailNarrow
                                 Bands-r13),
   mpdcch-NumRepetition-Paging-r13  ENUMERATED {r1, r2, r4,
                                 r8, r16, r32, r64, r128,
                                 r256},
   nB-v1310                      ENUMERATED {one64thT,
                                 one128thT, one256thT}
                                 OPTIONAL -- Need
OR
}
```

Further, as discussed in 3GPP TS 36.331 Chapter 6.7 NB-IoT RRC messages,

```
NB-IoT NPDCCH
   npdcch-NumRepetitionPaging-r13   ENUMERATED {
                                 r1, r2, r4, r8, r16,
                                 r32, r64, r128, r256,
                                 r512, r1024, r2048,
                                 spare4, spare3,
                                 spare2, spare1}
}
```

Additional values include:
<RepetitionNumber(N)PDSCH>: integer type
0—1
1—2
2—4
3—8
4—16
5—32
6—64
7—128
8—192
9—256
10—384
11—512
12—768
13—1024
14—1536
15—2048

3GPP TS 36.331 Chapter 6.3.2 Radio resource control information elements discusses,

```
CAT M1 PDSCH
PDSCH-ConfigCommon-v1310 ::=     SEQUENCE {
   pdsch-maxNumRepetitionCEmodeA-r13   ENUMERATED {
                                 r16, r32 }
                                 OPTIONAL, -- Need
OR
   pdsch-maxNumRepetitionCEmodeB-r13   ENUMERATED {
                                 r192, r256, r384, r512, r768,
                                 r1024, r1536, r2048}   OPTIONAL --
Need OR
}
```

The following is Table 16.4.1.3-2 from 3GPP TS 36.213 Chapter 16. NB-IoT NPDSCH.

TABLE 16.4.1.3-2

Number of repetitions ($N_{Rep}$) for NPDSCH.

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

TABLE 16.4.1.3-2-continued

Number of repetitions ($N_{Rep}$) for NPDSCH.

| $I_{Rep}$ | $N_{Rep}$ |
|---|---|
| 8 | 192 |
| 9 | 256 |
| 10 | 384 |
| 11 | 512 |
| 12 | 768 |
| 13 | 1024 |
| 14 | 1536 |
| 15 | 2048 |

Additional values include,
<RepetitionNumberPUCCH>: integer type
0—1
1—2
2—4
3—8
4—16
5—32
6—64
7—128

3GPP TS 36.331, Chapter 6.3.2 Radio resource control information elements states the following:

```
CAT M1 PUCCH
    pucch-NumRepetitionCE-r13        CHOICE {
        release              NULL,
        setup                CHOICE {
            modeA            SEQUENCE {
                pucch-NumRepetitionCE-format1-r13
                                ENUMERATED {r1,
                                    r2, r4, r8},
                pucch-NumRepetitionCE-format2-r13
                                ENUMERATED {r1,
                                    r2, r4, r8}
        },
        modeB                SEQUENCE {
            pucch-NumRepetitionCE-format1-r13
                                ENUMERATED {r4,
                                    r8, r16, r32},
            pucch-NumRepetitionCE-format2-r13
                                ENUMERATED {r4,
                                    r8, r16, r32}
        }
```

It is noted that for NB-IoT, there is no equivalent to the PUCCH in CAT M1 and LTE.

Further values include,
<RepetitionNumber(N)PUSCH>: integer type
0—1
1—2
2—4
3—8
4—16
5—32
6—64
7—128
8—192
9—256
10—384
11—512
12—768
13—1024
14—1536
15—2048

It is noted that for NB-IoT, 3GPP does not define PUCCH for NB-IoT.

The following is stated in 3 GPP TS 36.331 Chapter 6.3.2 Radio resource control information elements,

```
CAT M1 PUSCH PUSCH-ConfigCommon-v1310 ::=
    SEQUENCE {
    pusch-maxNumRepetitionCEmodeA-r13    ENUMERATED {
                                            r8, r16, r32 }   OPTIONAL,
                                            -- Need
    OR
    pusch-maxNumRepetitionCEmodeB-r13    ENUMERATED {
                                            r192, r256, r384,
                                            r512, r768, r1024,
                                            r1536, r2048}    OPTIONAL,
                                            -- Need
    OR
    pusch-HoppingOffset-v1310
                                            INTEGER
                                        (1..maxAvailNarrowBands-
                                            r13)             OPTIONAL --
                                                             Need
    OR
}
```

The following is Table 16.5.1.1-3 from 3GPP TS 36.213

TABLE 16.5.1.1-3

Number of repetitions ($N_{Rep}$) for NPUSCH.

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

The various aspects provided herein define commands (e.g., AT commands) to return CE mode, device type, and repetition numbers. The various aspects assist with the determination of whether a UE is in CE mode, which can be beneficial during device testing. Further, the disclosed aspects provide for efficiency during lab besting and/or field-testing.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 4:
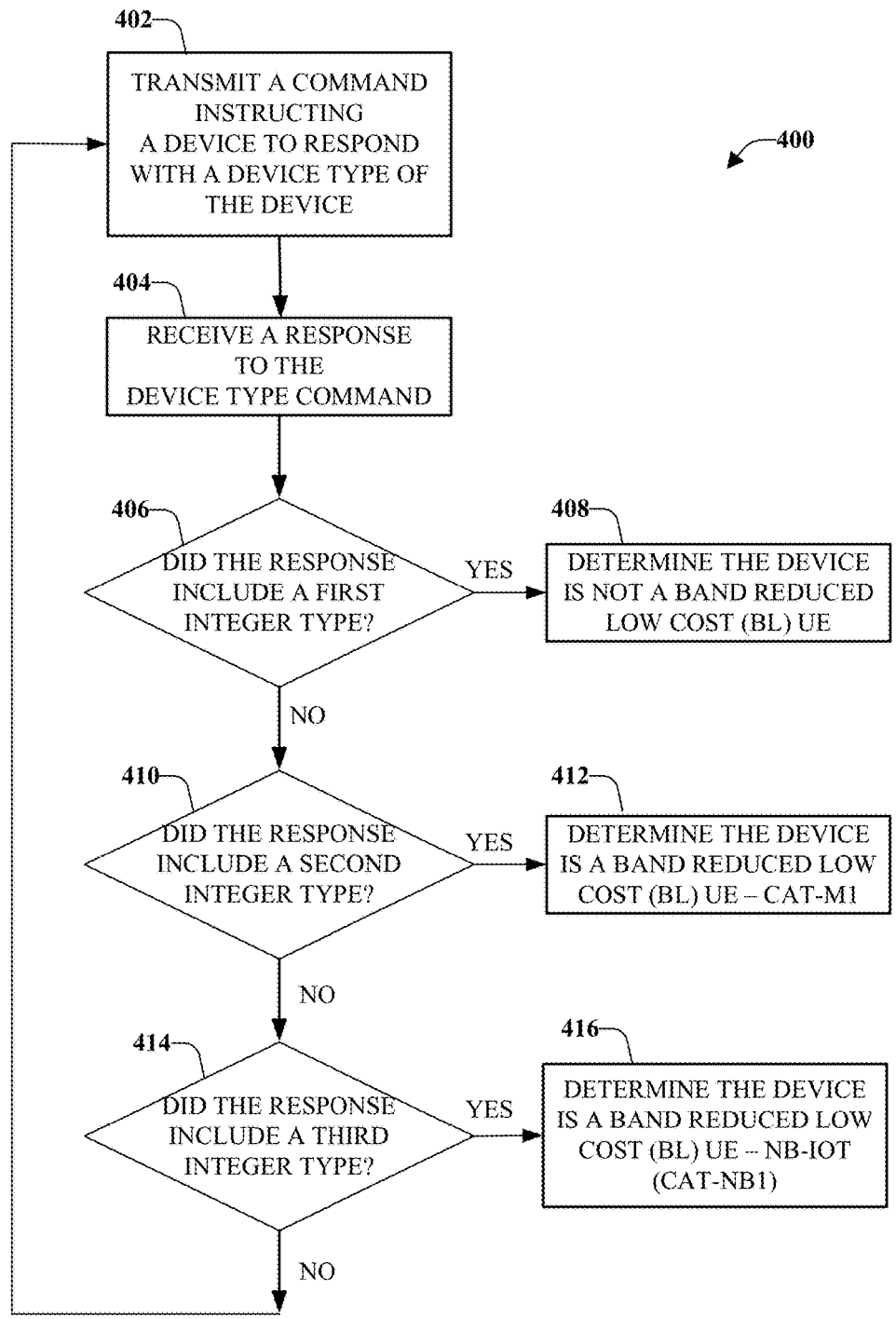
FIG. 4 illustrates a flow diagram of an example, non-limiting, computer-implemented method for a command related to a display device type in accordance with one or more embodiments described herein.

FIG. 4 illustrates a flow diagram of an example, non-limiting, computer-implemented method 400 for a command related to a display device type in accordance with one or more embodiments described herein. The method 400 can be implemented by a network device comprising a processor.

The method 400 begins at 402 when a command is transmitted to one or more devices instructing the one or more devices to respond with respective device types (DTs) of the one or more devices. As illustrated in Table 1 above, two commands may be transmitted, namely, "+PADT?" and "+PADT=". The read command (+PADT?) is transmitted to show the current device type setting of the device. The test command (+PADT=?) is transmitted to display values supported as a compound value.

At 404, a response to the command is received. As indicated in Table 1 above, a response to the +PADT? command can be "+PADT: <device type>." A response to the +PADT=? command can be "+PADT: (list of supported <device type>s)". Defined values for <device type> can be an integer type.

A determination is made, at 406, whether the integer type received is a first integer type or "0." If the integer type is the first integer type ("YES"), at 408, it is determined the device is not a band reduced low cost (BL) UE.

If the determination at 406 is that the integer type is not the first integer type ("NO"), at 410 a determination is made whether the integer type received is a second integer type or "1." If the determination is that the integer type is the second integer type ("YES"), at 412 a determination is made that the device is a band reduced low cost (BL) UE-CAT-M1.

If the determination at 410 is the response does not include the second integer type ("NO"), at 414, a determination is that the integer type is a third integer type ("YES"). Therefore, at 416, it is determined that the device is a band reduced low cost (BL) UE-NB-IOT (CAT-NB1). If the determination is that the integer type is not the third integer type ("NO"), the method can stop, or a another command can be transmitted at 402.

Figure 5:
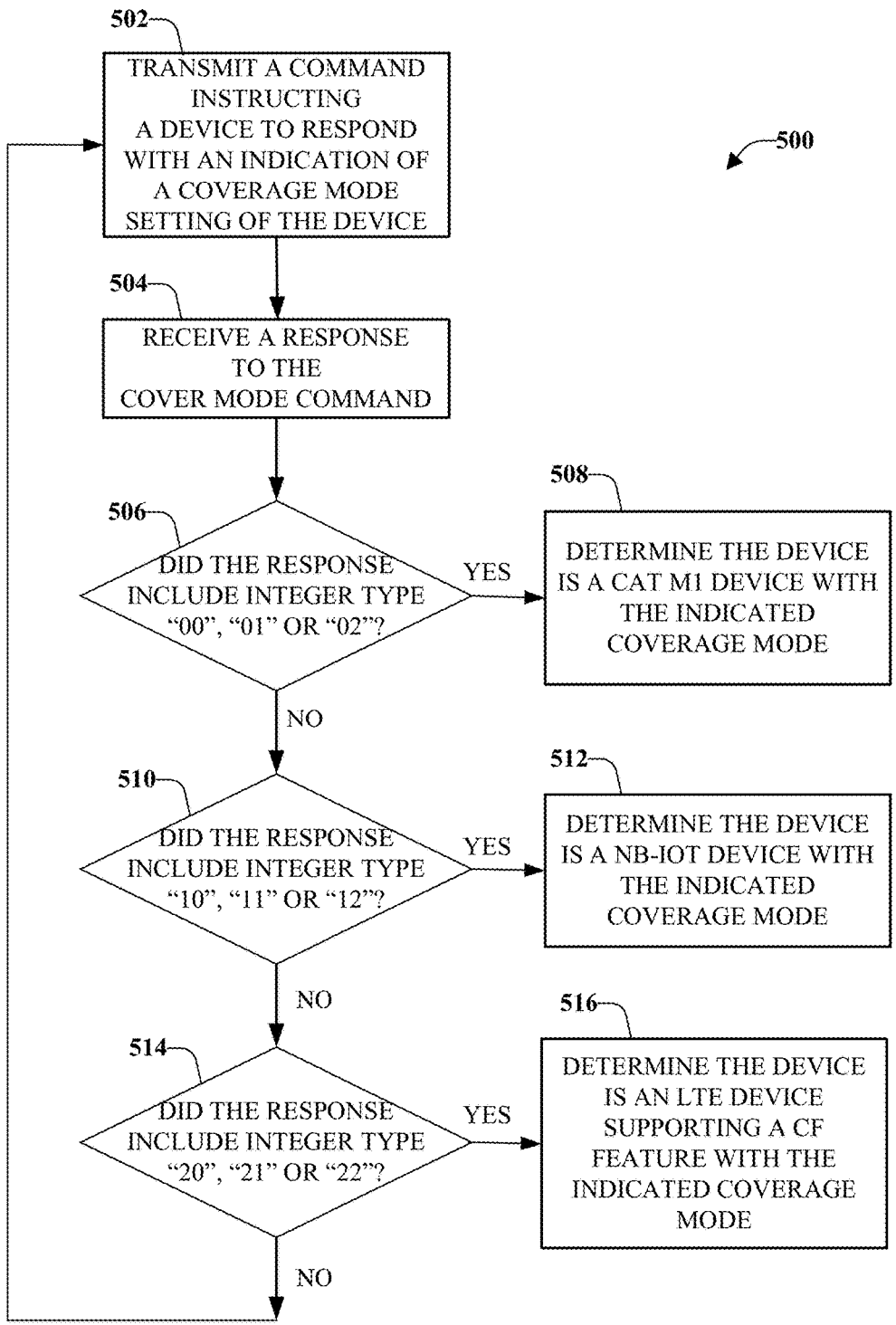
FIG. 5 illustrates a flow diagram of an example, non-limiting, computer-implemented method for a command related to a coverage type in accordance with one or more embodiments described herein.

FIG. 5 illustrates a flow diagram of an example, non-limiting, computer-implemented method 500 for a command related to a coverage type in accordance with one or more embodiments described herein. The method 500 can be implemented by a network device comprising a processor.

At 502, a command is transmitted to one or more user equipment devices instructing the devices to respond with an indication of a coverage mode of the device. As illustrated in Table 2 above, two commands may be transmitted, namely, "+PACEM?" and "+PACEM=". The read command (+PACEM?) is transmitted to show the current cover enhancement mode setting based on the device type. The test command (+PACEM=?) is transmitted to display values supported as a compound value.

At 504, a response to the command is received. As indicated in Table 2 above, a response to the +PACEM? command can be "+PACEM: <CE mode>." A response to the +PACEM=? command can be "+PACEM: (list of supported <CE Modes>s)". Defined values for <DE Mode> can be an integer type.

At 506, a determination is made whether the response included integer type "00," "01," or "02." If one of these types was included in the response ("YES"), at 508, it is determined that the device is a CAT M1 device with the indicated coverage mode. For integer type 00, the indicated coverage mode is that the device is in CE Mode A without repetitions. For integer type 01, the indicated coverage mode is that the device is in CE Mode A with repetitions. For integer type 02, the indicated coverage mode is that the device is in CE Mode B.

If the response did not include integer type "00," "01," or "02" ("NO"), the method 500 continues at 510, and a determination is made whether the response included integer type "10," "11," or "12." If one of these types was included in the response ("YES"), at 512 it is determined that the device is a NB-IoT device with the indicated coverage mode. For integer type 10, the indicated coverage mode is that the device is in basic coverage. For integer type 11, the indicated coverage mode is that the device is in robust coverage. Further, for integer type 12, the indicated coverage mode is that the device is in extreme coverage.

If the response did not include integer type "10," "11," or "12" ("NO"), at 514, a determination is made whether the response included integer type "20," "21," or "22." If one of these types is included in the response ("YES"), at 516 a determination is made that the device is an LTE device that supports a CE feature with the indicated coverage mode. For integer type 20, the indicated coverage mode is that the device is in CE Mode A without repetitions. For integer type 21, the indicated coverage mode is that the device is in CE Mode A with repetitions. For integer type 22, the indicated coverage mode is that the device is in CE Mode B. It the determination is that the response did not include any of these integer types ("NO"), method can stop, or can return to 502 with a transmission of another coverage mode command.

Figure 6:
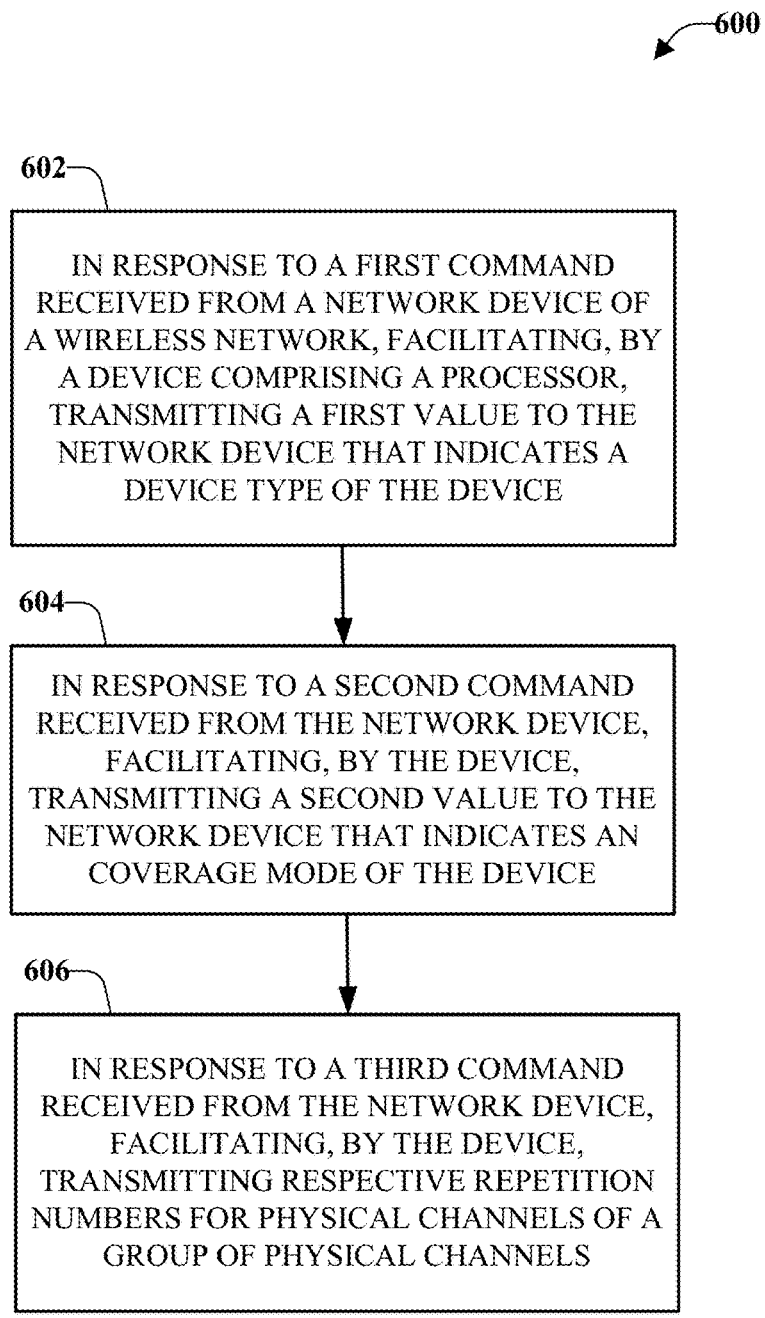
FIG. 6 illustrates a flow diagram of an example, non-limiting, computer-implemented method for replying to standardized commands for coverage modes in a wireless communications system in accordance with one or more embodiments described herein.

FIG. 6 illustrates a flow diagram of an example, non-limiting, computer-implemented method 600 for a replying to standardized commands for coverage modes in a wireless communications system in accordance with one or more embodiments described herein.

At 602, a device comprising a processor can facilitate transmitting a first value to the network device that indicates a device type of the device. The transmission can be in response to a first command received from a network device of a wireless network. According to some implementations, facilitating the transmission of the first value can comprise facilitating the transmission of a first integer value based on a determination that a first bandwidth usage applicable to the device exceeds a second bandwidth usage applicable to a standard bandwidth user equipment device. According to another implementation, facilitating the transmission of the first value can comprise facilitating the transmission of a second integer type based on a determination that a first bandwidth usage applicable to the device is less than a second bandwidth usage applicable to a standard bandwidth user equipment device. Alternatively, facilitating the transmission of the first value can comprise facilitating the transmission of a third integer type based on a determination that the device utilizes a low power wide area network radio protocol for communications in the wireless network.

The device can facilitate a transmission of a second value to the network device that indicates a coverage mode of the device, at 604. The transmission of the second value can be in response to a second command received from the network device, facilitating, by the device.

According to an implementation, facilitating the transmission of the second value can comprise facilitating the transmission of a first integer type based on a first determination that the device is a CAT M1 device or an LTE device that supports a CE feature, and is in a first enhanced coverage mode without repetitions. The first enhanced coverage mode can enable additional decibel coverage as compared with a standard communications signal. Alternatively, facilitating the transmission of the second value can comprise facilitating the transmission of a second integer type based on a second determination that the device is a CAT M1 device or an LTE device that supports a CE feature, and is in the first enhanced coverage mode with repetitions. In an alternative implementation, facilitating the transmission of the second value can comprise facilitating the transmission of a third integer type based on a third determination that the device is a CAT M1 device or an LTE device that supports a CE feature, and is in a second enhanced coverage mode.

In accordance with another implementation, facilitating the transmission of the second value can comprise facilitating the transmission of a first integer type based on a first determination that the device is a NB-IoT device and is in a first coverage level that comprises a 0 dB coverage extension. Alternatively, facilitating the transmission of the second value can comprise facilitating the transmission of a second integer type based on a second determination that the device is a NB-IoT device and is in a second coverage level that comprises a 10 dB coverage extension. Alternatively, facilitating the transmission of the second value can comprise facilitating the transmission of a third integer type based on a third determination that the device is a NB-IoT device and is in an third coverage level that comprises a 20 dB coverage extension. According to an implementation, the first coverage level can be a basic coverage, the second coverage level can be robust coverage, and the third coverage level can be extreme coverage, as defined in 3GPP TS 36.213.

At 606, the device can facilitate a transmission of respective repetition numbers for physical channels of a group of physical channels. The repetition numbers can specify a value for an access preamble. The transmission of the respective repetition numbers can be in response to a third command received from the network device.

Figure 7:
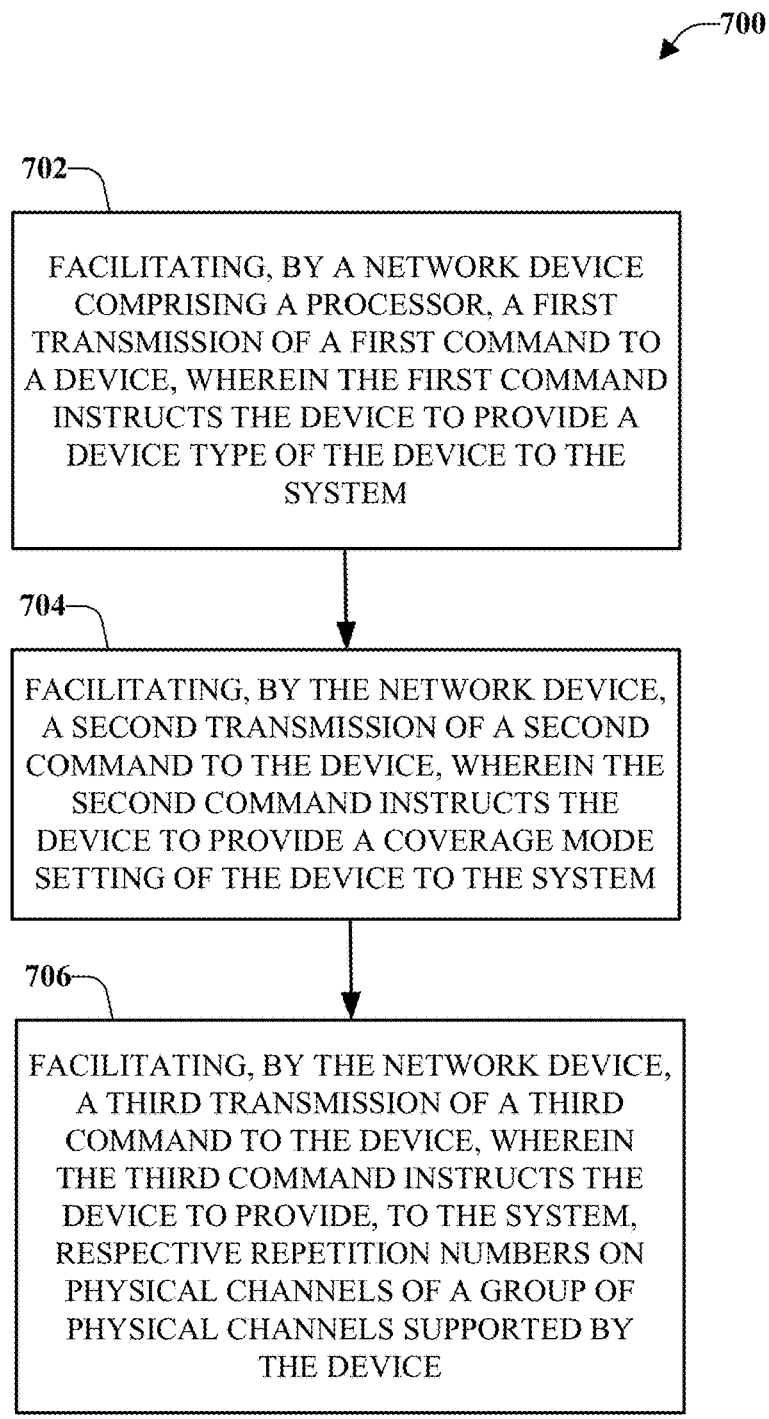
FIG. 7 illustrates a flow diagram of an example, non-limiting, computer-implemented method for transmitting standardized commands for coverage modes in a wireless communications system in accordance with one or more embodiments described herein.

According to an implementation, the first command, the second command, and the third command are instructions utilized to control a modem of the device. In accordance with some implementations, the first command, the second command, and the third command are standardized commands that are independent of a computing platform utilized by the device. In some implementations, the device can be classified as an Internet of Things device FIG. 7 illustrates a flow diagram of an example, non-limiting, computer-implemented method 700 for a transmitting standardized commands for coverage modes in a wireless communications system in accordance with one or more embodiments described herein.

The method 700 can start at 702 when a network device comprising a processor facilitates a first transmission of a first command to a device. The first command can instruct the device to provide a device type of the device to the network device. According to an implementation, the first command comprises a read command instructing the device to render a current device type setting of the device, and a test command instructing the device to display values supported as a compound value.

At 704, the network device can facilitate a second transmission of a second command to the device. The second command can instruct the device to provide a coverage mode setting of the device to the network device. According to an implementation, the second command can comprise a read command instructing the device to render a current coverage enhancement mode setting based on the device type, and a test command instructing the device to display values supported as a compound value.

The network device can facilitate a third transmission of a third command to the device, at 706. The third command can instruct the device to provide, to the network device, respective repetition numbers on physical channels of a group of physical channels supported by the device.

Figure 8:
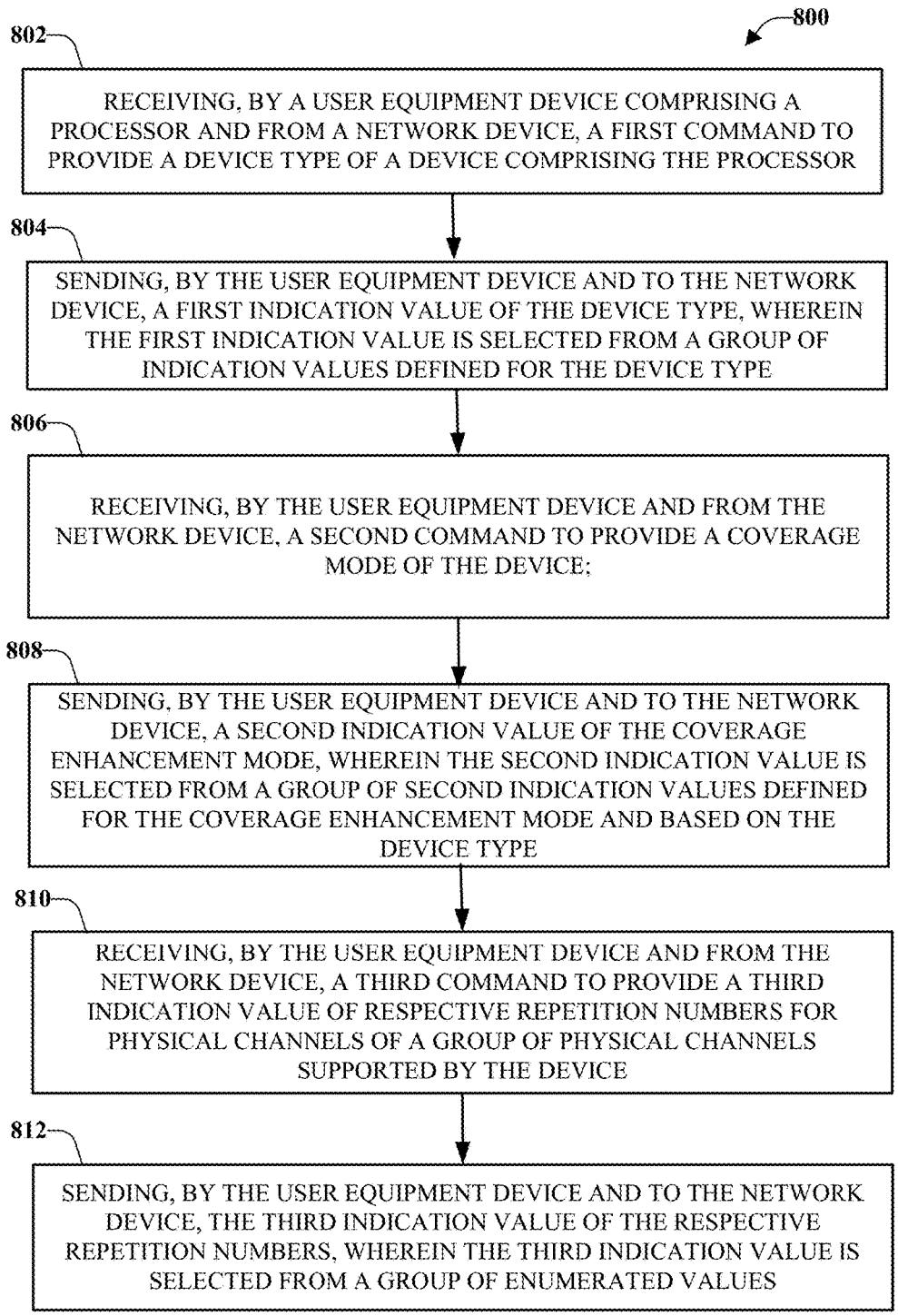
FIG. 8 illustrates a flow diagram of an example, non-limiting, computer-implemented method for receiving and responding to standardized commands for coverage modes in a wireless communications system in accordance with one or more embodiments described herein.

According to some implementations, the first command, the second command, and the third command are formatted according to a protocol that enables transmission of the first command, the second command, and the third command irrespective of an operating system utilized by the device FIG. 8 illustrates a flow diagram of an example, non-limiting, computer-implemented method 800 for a receiving and responding to standardized commands for coverage modes in a wireless communications system in accordance with one or more embodiments described herein.

A user equipment device comprising a processor can receive at 802, from a network device, a first command to provide a device type of the user equipment device. The user equipment device sends, to the network device, a first indication value of the device type, at 804. The first indication value can be selected from a group of indication values defined for the device type.

At 806, the user equipment device can receive, from the network device, a second command to provide a coverage mode of the device. The user equipment device can send, to the network device a second indication value of the coverage enhancement mode, at 808. The second indication value can be selected from a group of second indication values defined for the coverage enhancement mode and based on the device type.

Further, at 810, the user equipment device can receive, from the network device, a third command to provide a third indication value of respective repetition numbers for physical channels of a group of physical channels supported by the device. At 812, the user equipment device can send, to the network device, the third indication value of the respective repetition numbers. The third indication value can be selected from a group of enumerated values.

According to some implementations, the user equipment device can be an Internet of Things device that utilizes a low power wide area network radio technology for communicating within a communications network comprising the network device. In some implementations, the first command, the second command, and the third command can be a group of commands standardized for facilitating communication with a communications network. The first command, the second command, and the third command can be independent of a device configuration of the device.

Figure 9:
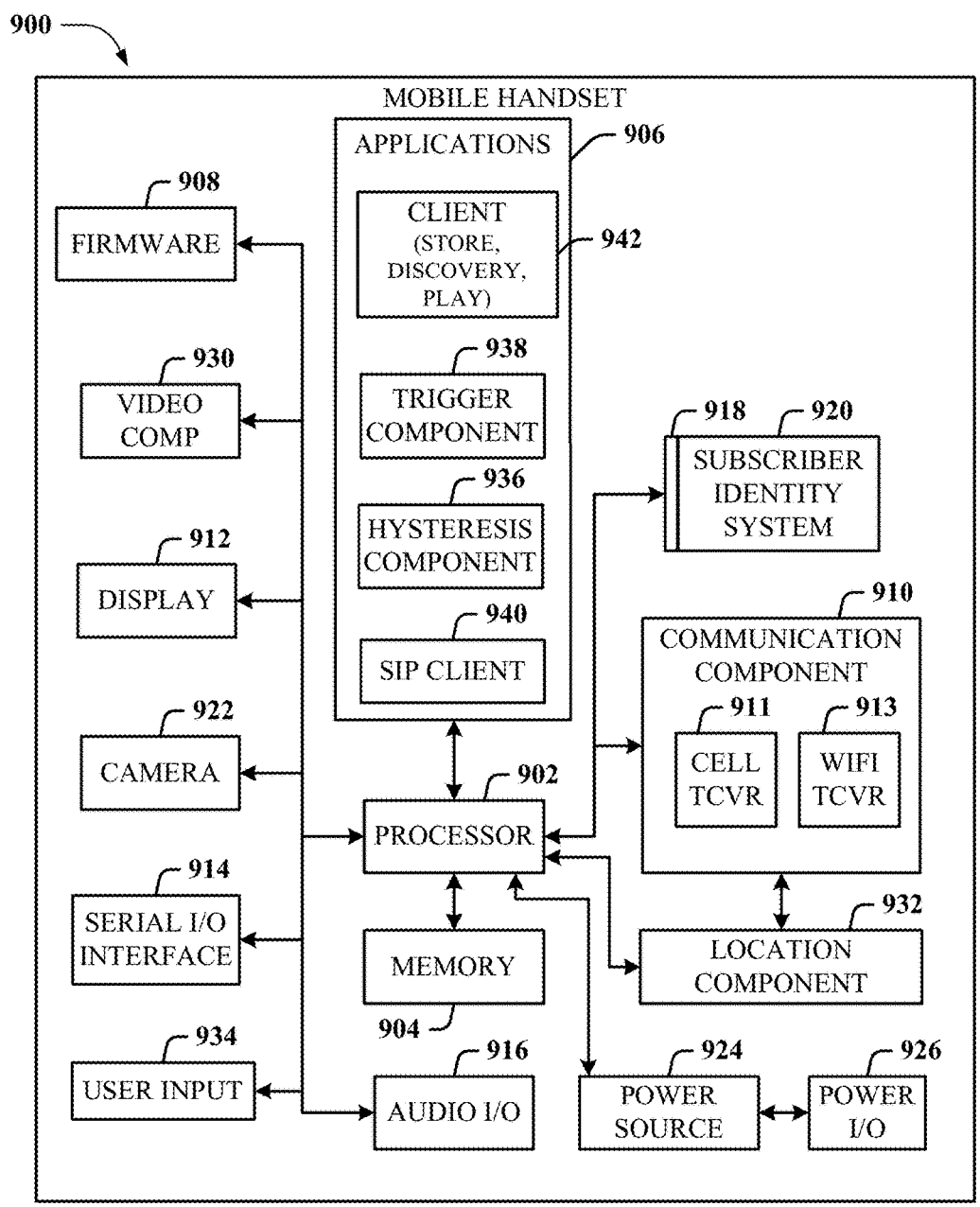
FIG. 9 illustrates an example block diagram of an example mobile handset operable to engage in a system architecture that facilitates wireless communications according to one or more embodiments described herein.

Referring now to FIG. 9, illustrated is a schematic block diagram of an exemplary end-user device such as a mobile device or handset 900 capable of connecting to a network in accordance with some embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio 110 component 916, which can include a speaker for the output of audio signals related to, for example, indication that the user pressed the proper key or key combination to initiate the user feedback signal. The audio 110 component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power 110 component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal.

The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
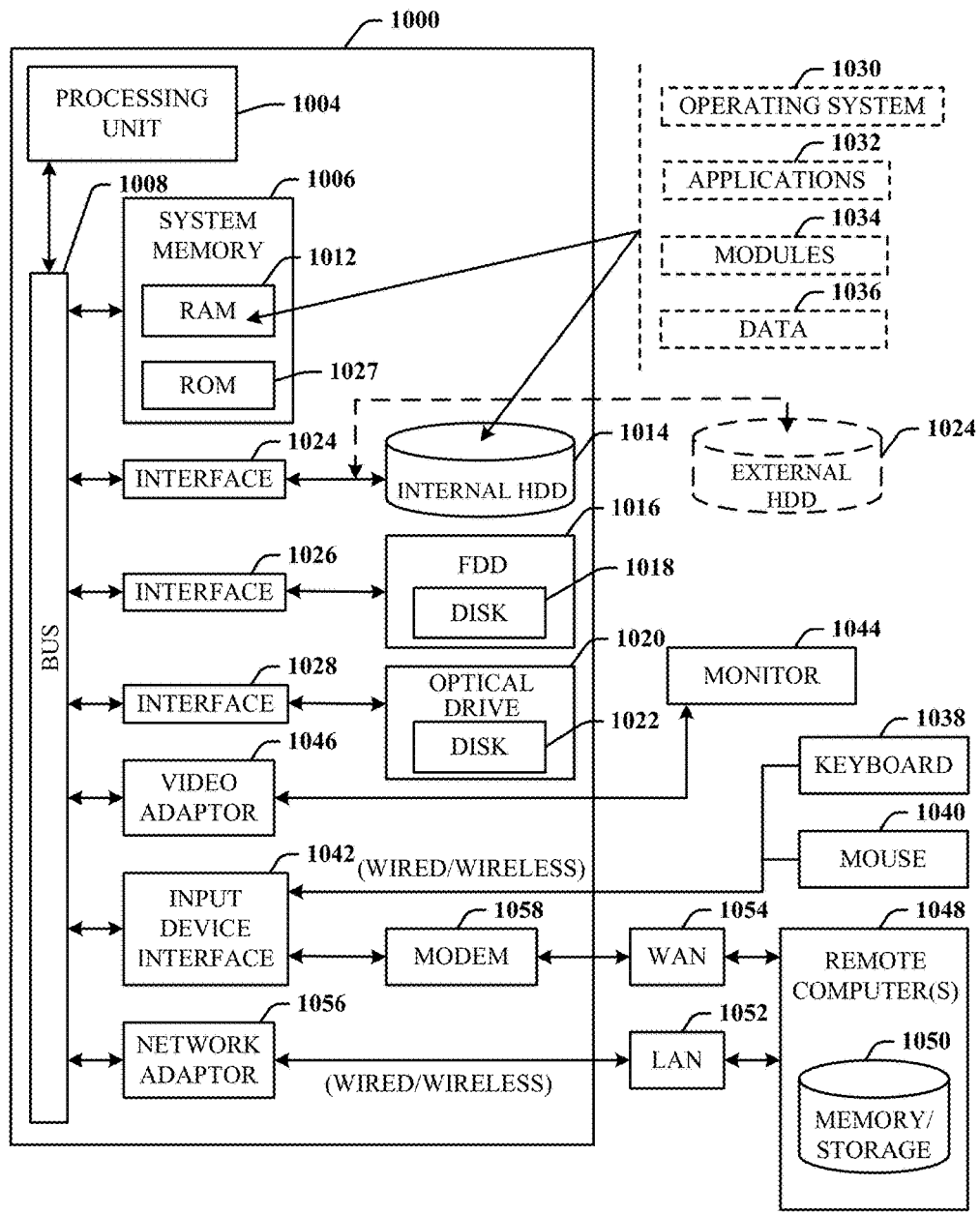
FIG. 10 illustrates an example block diagram of an example computer operable to engage in a system architecture that facilitates wireless communications according to one or more embodiments described herein.

Referring now to FIG. 10, there is illustrated a block diagram of a computer 1000 operable to execute a system architecture that facilitates establishing a transaction between an entity and a third party. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As utilized herein, terms "component," "engine," "module," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   in response to a first command received from a network device of a wireless network, facilitating, by a device comprising a processor, transmitting a first value to the network device that indicates a device type of the device;
   in response to a second command received from the network device, facilitating, by the device, transmitting a second value to the network device that indicates a coverage mode of the device; and
   in response to a third command received from the network device, facilitating, by the device, transmitting respective repetition numbers for physical channels of a group of physical channels.

2. The method of claim 1, wherein the facilitating the transmitting of the first value comprises facilitating the transmitting of a first integer value based on a determination that a first bandwidth usage applicable to the device exceeds a second bandwidth usage applicable to a standard bandwidth user equipment device.

3. The method of claim 1, wherein the facilitating the transmitting of the first value comprises facilitating the transmitting of a second integer type based on a determination that a first bandwidth usage applicable to the device is less than a second bandwidth usage applicable to a standard bandwidth user equipment device.

4. The method of claim 1, wherein the facilitating the transmitting of the first value comprises facilitating the transmitting of a third integer type based on a determination that the device utilizes a low power wide area network radio protocol for communications in the wireless network.

5. The method of claim 1, wherein the facilitating the transmitting of the second value comprises facilitating the transmitting of a first integer type based on a determination that the device is in an enhanced coverage mode without repetitions, wherein the enhanced coverage mode enables additional decibel coverage as compared with a standard communications signal transmitted by the device.

6. The method of claim 1, wherein the facilitating the transmitting of the second value comprises facilitating the transmitting of a second integer type based on a determination that the device is in a first enhanced coverage mode with repetitions, and wherein the first enhanced coverage mode enables additional decibel coverage as compared with a standard communications signal transmitted by the device.

7. The method of claim 6, wherein the facilitating the transmitting of the second value comprises facilitating the transmitting of a third integer type based on a determination that the device is in a second enhanced coverage mode.

8. The method of claim 1, wherein the facilitating the transmitting of the second value comprises facilitating the transmitting of a first integer type based on a determination that the device is operating according to a coverage level that comprises a 0 dB coverage extension.

9. The method of claim 1, wherein the facilitating the transmitting of the second value comprises facilitating the transmitting of a second integer type based on a determination that the device is operating according to a coverage level that comprises a 10 dB coverage extension.

10. The method of claim 1, wherein the facilitating the transmitting of the second value comprises facilitating the transmitting of a third integer type based on a determination that the device is in a coverage level that comprises a 20 dB coverage extension.

11. The method of claim 1, wherein the first command, the second command, and the third command are instructions utilized to control a modem of the device.

12. The method of claim 1, wherein the first command, the second command, and the third command are standardized commands that are independent of a computing platform utilized by the device.

13. The method of claim 1, wherein the device is classified as an Internet of Things device.

14. A system, comprising:
a processor; and
a memory that stores executable instructions that, when executed by the processor, facilitate performance of operations, comprising:
facilitating a first transmission of a first command to a device, wherein the first command instructs the device to provide a device type of the device to the system;
facilitating a second transmission of a second command to the device, wherein the second command instructs the device to provide a coverage mode setting of the device to the system; and
facilitating a third transmission of a third command to the device, wherein the third command instructs the device to provide, to the system, respective repetition numbers on physical channels of a group of physical channels supported by the device.

15. The system of claim 14, wherein the first command, the second command, and the third command are formatted according to a protocol that enables transmission of the first command, the second command, and the third command irrespective of an operating system utilized by the device.

16. The system of claim 14, wherein the first command comprises a read command instructing the device to render a current device type setting of the device, and a test command instructing the device to display values supported as a compound value.

17. The system of claim 14, wherein the second command comprises a read command instructing the device to render a current coverage enhancement mode setting based on the device type, and a test command instructing the device to display values supported as a compound value.

18. A non-transitory machine-readable medium, comprising executable instructions that, when executed by a processor, facilitate performance of operations, comprising:
receiving, from a network device, a first command to provide a device type of a device comprising the processor;
sending, to the network device, a first indication value of the device type, wherein the first indication value is selected from a group of indication values defined for the device type;
receiving, from the network device, a second command to provide a coverage mode of the device;
sending, to the network device, a second indication value of the coverage mode, wherein the second indication value is selected from a group of second indication values defined for the coverage mode and based on the device type;
receiving, from the network device, a third command to provide a third indication value of respective repetition numbers for physical channels of a group of physical channels supported by the device; and
sending, to the network device, the third indication value of the respective repetition numbers, wherein the third indication value is selected from a group of enumerated values.

19. The non-transitory machine-readable medium of claim 18, wherein the device is an Internet of Things device that utilizes a low power wide area network radio technology for communicating within a communications network comprising the network device.

20. The non-transitory machine-readable of claim 18, wherein the first command, the second command, and the third command are a group of commands standardized for facilitating communication with a communications network, and wherein the first command, the second command, and the third command are independent of a device configuration of the device.

* * * * *